United States Patent
Ko

(10) Patent No.: US 12,290,781 B2
(45) Date of Patent: *May 6, 2025

(54) AIR DRYER AND METHOD FOR DRYING COMPRESSED AIR USING SAME

(71) Applicant: EUNHA AIRTECHNOLOGY CO., LTD., Asan-si (KR)

(72) Inventor: In Ho Ko, Pyeongtaek-si (KR)

(73) Assignee: EUNHA AIRTECHNOLOGY CO., LTD., Asan-si (KR)

( * ) Notice: Subject to any disclaimer, the term of this patent is extended or adjusted under 35 U.S.C. 154(b) by 378 days.

This patent is subject to a terminal disclaimer.

(21) Appl. No.: 17/718,405

(22) Filed: Apr. 12, 2022

(65) Prior Publication Data

US 2022/0331734 A1 Oct. 20, 2022

(30) Foreign Application Priority Data

Apr. 14, 2021 (KR) .......................... 10-2021-0048684

(51) Int. Cl.
*B01D 53/26* (2006.01)
*B01D 53/14* (2006.01)

(52) U.S. Cl.
CPC ....... *B01D 53/265* (2013.01); *B01D 53/1425* (2013.01); *B01D 53/263* (2013.01); *B01D 2257/80* (2013.01); *B01D 2259/40003* (2013.01)

(58) Field of Classification Search
CPC B01D 53/265; B01D 53/1425; B01D 53/263; B01D 2257/80; B01D 2259/40003; B01D 53/261; B01D 53/26; B01D 5/009; B01D 53/0438; B01D 53/1423; F04B 39/16

USPC .......................................................... 34/418
See application file for complete search history.

(56) References Cited

U.S. PATENT DOCUMENTS

| 2,515,098 | A | * | 7/1950 | Smith, Jr. | ............. | C01B 13/145 62/271 |
| 3,855,719 | A | | 12/1974 | Jonsson | | |
| 3,864,102 | A | * | 2/1975 | Powers | ................. | F26B 21/001 95/122 |
| 4,016,657 | A | * | 4/1977 | Passey | .................... | F25B 49/00 62/324.3 |

(Continued)

FOREIGN PATENT DOCUMENTS

| CN | 203002186 U | 6/2013 |
| CN | 110115914 A | 8/2019 |

(Continued)

OTHER PUBLICATIONS

Chinese Office Action issued Jan. 10, 2024 in Application No. 202210370708.0.

(Continued)

*Primary Examiner* — Stephen M Gravini
(74) *Attorney, Agent, or Firm* — Sughrue Mion, PLLC

(57) ABSTRACT

An air dryer includes a pair of main air dryer dehumidification tanks in which a dehumidification process and a regeneration process are alternately performed; a main compressor for compressing wet air to supply the wet air to an inlet line; a first direction switching valve unit; a regeneration special dryer; a second direction switching valve unit; a heating unit; and a cooler, wherein a path of cooled dry air passing through the cooler is connected to the inlet line.

7 Claims, 8 Drawing Sheets

(56) References Cited

U.S. PATENT DOCUMENTS

| | | | | |
|---|---|---|---|---|
| 5,335,426 | A | * | 8/1994 | Settlemyer ............ B01D 53/261 34/80 |
| 5,669,154 | A | * | 9/1997 | Bellomo ................ B01D 53/24 34/88 |
| 5,901,464 | A | * | 5/1999 | Kazakis ................ B60T 17/004 34/562 |
| 8,650,770 | B1 | * | 2/2014 | Levy .................... F26B 21/001 62/271 |
| 8,869,424 | B2 | * | 10/2014 | Hermann ............ A47L 15/0034 134/107 |
| 11,713,924 | B2 | * | 8/2023 | Zielinski ................ F26B 23/04 34/92 |
| 12,044,472 | B2 | * | 7/2024 | Ko .......................... F26B 7/005 |
| 2022/0331734 | A1 | * | 10/2022 | Ko ....................... B01D 53/261 |
| 2022/0333862 | A1 | | 10/2022 | Ko |
| 2023/0314074 | A1 | | 10/2023 | Lee et al. |

FOREIGN PATENT DOCUMENTS

| | | | | |
|---|---|---|---|---|
| CN | 115193226 | A | * 10/2022 | ............ B01D 5/009 |
| JP | 2019-3941 | A | 1/2019 | |
| KR | 20-0197532 | Y1 | 9/2000 | |
| KR | 10-2017-0000934 | A | 1/2017 | |
| KR | 20220142220 | A | * 10/2022 | |
| WO | 2018/121486 | A1 | 7/2018 | |

OTHER PUBLICATIONS

Korean Office Action issued Jul. 9, 2022 in Application No. 10-2021-0048684.
Chinese Office Action issued Jan. 11, 2024 in Application No. 202210370964.X.
Korean Office Action issued Jul. 9, 2022 in Application No. 10-2021-0048685.
Office Action issued Jan. 2, 2024 in U.S. Appl. No. 17/718,384.

* cited by examiner

——— Dehumidification path
— — — Regeneration path

———— Dehumidification path
-- -- -- Regeneration path

AIR DRYER AND METHOD FOR DRYING COMPRESSED AIR USING SAME

CROSS REFERENCE TO RELATED APPLICATIONS

This Application claims priority based on Korean Patent Application No. 10-2021-0048684 filed Apr. 14, 2021 in the Korea Intellectual Property Office, of which content is incorporated by reference in its entirety.

BACKGROUND OF THE DISCLOSURE

Field of the Disclosure

The present disclosure relates to an air dryer and a method for drying compressed air using the same and, more particularly, to an apparatus for drying compressed air and a method for drying compressed air using the same, which includes a pair of dehumidification tanks provided to input the compressed air of high temperature and high pressure wasted in a regeneration process into a dehumidification process again and minimize the energy waste.

Related Art

Generally, a compressed air drying apparatus that removes moisture contained in air is widely used in the industrial field such as all sorts of automation facilities, a semiconductor manufacturing line, a painting line, a chemical process in which a chemical reaction occurs when contacting moisture.

The compressed air drying apparatus is largely classified into a freezing type in which temperature of compressed air is lowered by using a freezing compressor and the moisture included in the air is condensed and dehumidified, and an absorption type in which compressed air including moisture is passing through a tank in which a dehumidifying agent is filled, and the moisture included in the compressed air is absorbed in the dehumidifying agent.

The absorption type compressed air drying apparatus is classified into an unheated type that does not require a heating source and a heated type that requires a heating source according to a regeneration type of the dehumidifying agent. The unheated type does not require a heating source, and has great consumption of compressed air required for regeneration, and accordingly, there is a disadvantage that it consumes a lot of energy. The heated type has an advantage that the energy consumption is small in comparison with the unheated type since the dehumidifying agent is regenerated by a heating source (heating unit).

The absorption type compressed air drying apparatus includes two tanks in which the dehumidifying agent is filled such that while a tank processes a dehumidification process, another tank processes a regeneration process of the dehumidified dehumidifying agent. After a preset time, the tank that processes the dehumidification process is switched to the regeneration process, and the tank that processes the regeneration process is switched to the dehumidification process.

FIG. 1 schematically illustrates the conventional compressed air drying apparatus and is a schematic diagram showing that a first tank 10 performs a compressed air dehumidification process, and a second tank 20 performs a regeneration process of a dehumidifying agent. FIG. 2 is a schematic diagram illustrating that the second tank 20 performs the compressed air dehumidification process, and the first tank 10 performs the regeneration process of the dehumidifying agent.

Referring to FIG. 1, when wet compressed air WA is supplied from a lower portion of the first tank 10 through a direction switching valve 30, the wet compressed air WA is dried by passing through an upper portion of the first tank 10, and the dried compressed air DA moves to the upper portion of the first tank 10 and is discharged through a check valve 51.

A part of the discharged dried compressed air DA is supplied to an upper portion of the second tank 20 through a return path 90. A heating unit 70 is installed in the regenerated air supplying path 90, and through the path 90, the dried compressed air DA supplied to the second tank 20 is heated to a temperature of 200 to 250° C. to supply the regenerated air to the second tank 20.

In this case, a flow control valve 60 is installed in the regenerated air supplying path 90 to supply the dried compressed air DA dried by about 8 to 15% to the second tank 20 in a uniform pressure through a regenerated air control value and an orifice.

As described above, the compressed air DA heated through the regenerated air supplying path 90 is input to the upper portion of the second tank 20 and heats the dehumidifying agent dehumidified in the second tank 20 to detach moisture from the dehumidifying agent and regenerate, and the regenerated air containing moisture through the lower portion of the second tank 20 is discharged to the exterior through a valve 42 and a muffler 80.

After the dried regenerated air DA heated for a preset time is supplied to the second tank 20 and the dehumidifying agent is regenerated, the power of the heating unit 70 is shut off according to a preset time, and the dried regenerated air in a room temperature state is continuously supplied to the second tank 20 to cool down the dehumidifying agent.

And then, after a preset time, as shown in FIG. 2, the direction switching valve 30 switches the path of the wet compressed air WA to be supplied to the second tank 20, and the dehumidification process of the wet compressed air WA is performed, and the first tank 10 performs the regeneration process.

In this case, likewise, a part of the dried compressed air DA dried through regenerated air supplying path 90 is heated by the heating unit 70 and supplied to the first tank 10 to pass through the regeneration process.

As such, in the case of the conventional compressed air drying apparatus, there is an advantage that a part of the dry air produced after the dehumidification process is completed is used for the regeneration process, but the conventional compressed air drying apparatus has a structure of unable to use the entire air without loss by mixing the air with input wet air.

Furthermore, the conventional compressed air drying apparatus is provided such that the compressed dry air supplied through a regeneration path is used in the regeneration process and discharged in the compressed air of high temperature and humidity, and there is a problem that the compressed air influences the atmosphere near to the muffler through which the air is discharged.

In short, as described above, the conventional compressed air drying apparatus uses a part of the discharged compressed air in the dehumidifying agent regeneration process, and there is a significant problem that there is a lot of energy loss since a part of the compressed dry air having a pressure of 7.0 to 9.0 kgf/cm$^2$G in general is used in the regeneration process and discharged.

SUMMARY OF THE DISCLOSURE

The air dryer according to an embodiment of the present disclosure is to regenerate a dehumidifying agent by supplying dry air of high temperature required for the regeneration from a separate regeneration special air dryer, and further, make the dry air be joined with wet air in a wet air inlet line of the air dryer and dehumidified, and therefore, a uniform amount of dry air is continuously supplied.

The air dryer according to an embodiment of the present disclosure is to detain discharge of the compressed air of high temperature and humidity generated after regenerating a dehumidifying agent and minimize the influence on the peripheral environment.

Technical objects to be achieved by the present disclosure are not limited to the aforementioned technical objects, and other technical objects not described above may be evidently understood by a person having ordinary skill in the art to which the present disclosure pertains from the following description.

In an aspect of the present disclosure to solve the problem, an air dryer includes a pair of main air dryer dehumidification tanks in which a dehumidification process and a regeneration process are alternately performed; a main compressor for compressing wet air to supply the wet air to an inlet line; a first direction switching valve unit configured to transfer a path of the compressed wet air supplied from the inlet line to the dehumidification tank that performs the dehumidification process between the pair of main air dryer dehumidification tanks or to transfer a path of the regenerated air discharged from the dehumidification tank that performs the regeneration process between the pair of main air dryer dehumidification tanks; a regeneration special dryer configured to transfer regeneration special dry air to the dehumidification tank of the main air dryer that performs the regeneration process between the pair of main air dryer dehumidification tanks; a second direction switching valve unit configured to transfer the compressed dry air supplied from the dehumidification tank that performs the dehumidification process between the pair of dehumidification tanks or transfer the regeneration special dry air supplied from the regeneration special dryer to the dehumidification tank that performs the regeneration process between the pair of dehumidification tanks; a heating unit configured to heat the regeneration special dry air supplied from the regeneration special dryer; and a cooler configured to detach moisture from the dehumidifying agent filled in the dehumidification tank that performs the regeneration process between the pair of dehumidification tanks by the regeneration special air dryer heated by the heating unit and generate condensate water.

Here, the air dryer may further include a regeneration special compressor configured to supply compressed air.

Here, the air dryer may further include a moisture separator connected to the cooler and to separate the condensate water.

Here, a regeneration special compressor 600 is provided to compress the regeneration special dry air at a pressure of 0.2 to 0.7 kgf/cm$^2$G of which is higher than the pressure of the wet air supplied from the inlet line and connect the cooled dry air path with the inlet line.

Here, the air dryer may further include a third direction switching valve unit configured to transfer the path of the regeneration special dry air supplied from the regeneration special dryer to either one direction between a direction to the outlet line or a direction to the heating unit.

Here, the air dryer may further include a first control valve in a direction to the outlet line and a second control valve in a direction to the heating unit to control a state in which the regeneration special dry air is transferred to outer opposite ends of the third direction switching valve unit.

Here, the air dryer may further include a bypass flow path to connect between the third direction switching valve unit and the first control valve, and between the second control valve and the heating unit, wherein in the bypass flow line, a second valve provided to block or pass through the compressed dry air transferred from the first direction switching valve and a third control valve to control a state of transferring the compressed dry air that passes through the second valve are provided.

Here, the processing capability of the compressed air that passes through the pair of main air dryer dehumidification tanks needs to be equal to or lower than the dryness of the regeneration special dry air supplied from the regeneration special dryer.

Here, a dew point temperature (x) of the compressed dry air of the main air dryer or the regeneration special dryer may be −40 to −100° C.

In another aspect of the present disclosure to solve the problem, a method for drying compressed air includes a dehumidification process in which compressed wet air supplied from the inlet line is passing through a preset dehumidification tank between a pair of main air dryer dehumidification tanks in which a dehumidifying agent is filled, moisture of the wet air is absorbed in the dehumidifying agent, and the produced dry air is discharged to an outlet line; a heating process in which separate regeneration special dry air is supplied from a regeneration special dryer and heated by a heating unit installed in a heating line to heat and regenerate the dehumidifying agent that absorbs the moisture included in another dehumidification tank that has performed the dehumidification process already while the dehumidification process is progressing, and the heated regeneration special dry air is supplied to another dehumidification tank and passes therethrough, and then, the dehumidifying agent that absorbs the moisture is heated and the moisture is detached; and a cooling process of 1 to 3 hours such that hot air in a wet steam state reaches room temperature in a state in which power of the heating unit is shut off and driving is stopped after the heating process is finished.

Here, the method for drying compressed air may further include setting a third direction switching valve unit configured to transfer a path of the regeneration special dry air supplied from the regeneration special dryer to either one direction between a direction to the outlet line or a direction to the heating unit such that the regeneration special dry air supplied from the regeneration special dryer is transferred to the outlet line.

Here, the dehumidification process for discharging the produced dry air to the outlet line may further include blocking the third direction switching valve unit such that the regeneration special dry air supplied from the regeneration special dryer is not transferred to the outlet line.

Here, the method for drying compressed air may further include cooling the wet steam passing through the cooling process through the cooler; and separating moisture detached through the cooler through a moisture separator.

TECHNICAL EFFECT OF THE DISCLOSURE

The air dryer according to an embodiment of the present disclosure may regenerate a dehumidifying agent by supplying dry air of high temperature required for the regeneration from a separate regeneration special air dryer, and further, make the dry air be joined with wet air in a wet air inlet line of the air dryer and dehumidified, and therefore, a uniform amount of dry air is continuously supplied. Consequently, the continuous supply of compressed dry air is available to an automation facility that requires dry air, a semiconductor manufacturing line, a painting line, a chemical process in which a chemical reaction occurs when contacting moisture.

The air dryer according to an embodiment of the present disclosure may detain discharge of the compressed air of high temperature and humidity generated after regenerating a dehumidifying agent and minimize the influence on the peripheral environment.

The technical effects of the present disclosure are not limited to the technical effects described above, and other technical effects not mentioned herein may be understood to those skilled in the art to which the present disclosure belongs from the description.

DESCRIPTION OF EXEMPLARY EMBODIMENTS

The objects and effects of the present disclosure, and technical constitutions of accomplishing these will become obvious with reference to exemplary embodiments to be described below in detail along with the accompanying drawings. In describing the present disclosure, a detailed description of known function or constitutions will be omitted if it is determined that it unnecessarily makes the gist of the present disclosure unclear. In addition, terms to be described below as terms which are defined in consideration of functions in the present disclosure may vary depending on the intention of a user or an operator or usual practice.

However, the present disclosure is not limited to exemplary embodiments disclosed below but may be implemented in various forms. However, the exemplary embodiments are provided to make the present disclosure be complete and completely announce the scope of the present disclosure to those skilled in the art to which the present disclosure belongs and the present disclosure is just defined by the scope of the claims. Accordingly, the terms need to be defined based on contents throughout this specification.

Throughout the specification, when a part "includes" or "comprises" an element, unless there is a particular description contrary thereto, the part can further include other elements. Also, throughout the specification, the term "portion" or "unit" means a unit of processing at least one function or operation and may be implemented in a hardware component, a software component, or a combination of software and hardware components.

Further, in the exemplary embodiments of the present disclosure, each of components, functional blocks or means may be constituted by one or more lower components, and electrical, electronic, and mechanical functions performed by respective components may be implemented as various known devices or mechanical elements including an electronic circuit, an integrated circuit, an Application Specific Integrated Circuit (ASIC), and the like, and the respective components may be separately implemented or two or more components may be integrated into one and implemented.

Hereinafter, an air dryer and a compressed air drying method according to an embodiment of the present disclosure will be described in detail with reference to the accompanying drawings.

Figure 1:
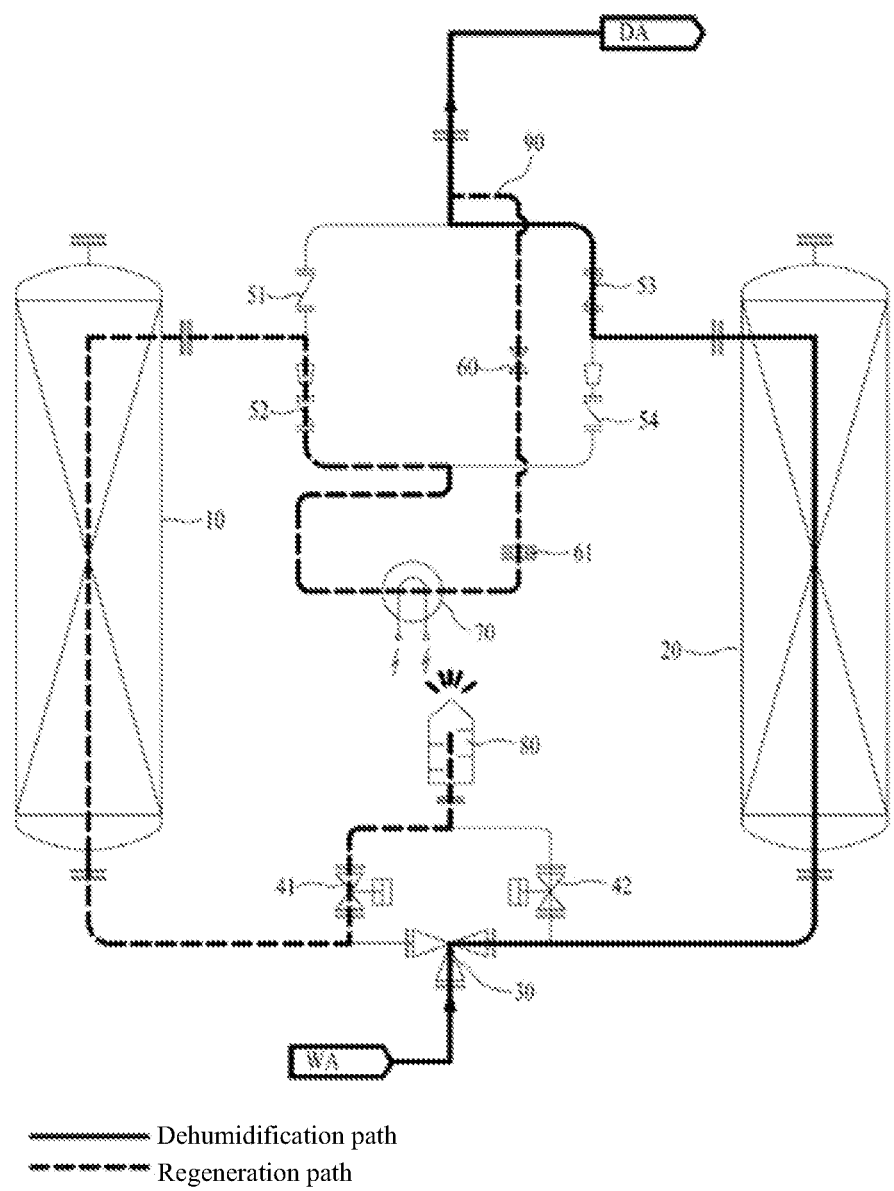
FIG. 1 schematically illustrates the conventional compressed air drying apparatus and is a schematic diagram showing that a first tank 10 performs a compressed air dehumidification process, and a second tank 20 performs a regeneration process of a dehumidifying agent.
Figure 2:
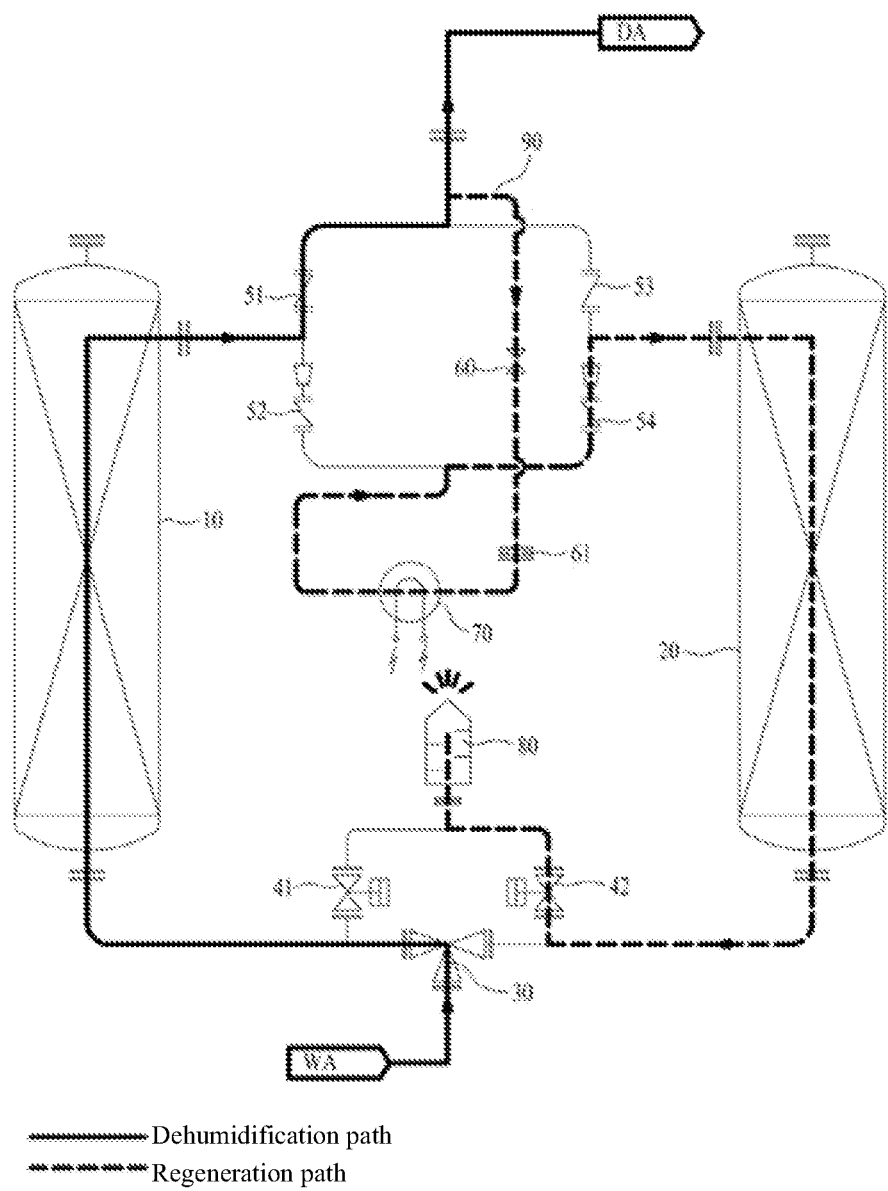
FIG. 2 is a schematic diagram illustrating that the second tank 20 performs the compressed air dehumidification process, and the first tank 10 performs the regeneration process of the dehumidifying agent.
Figure 3:
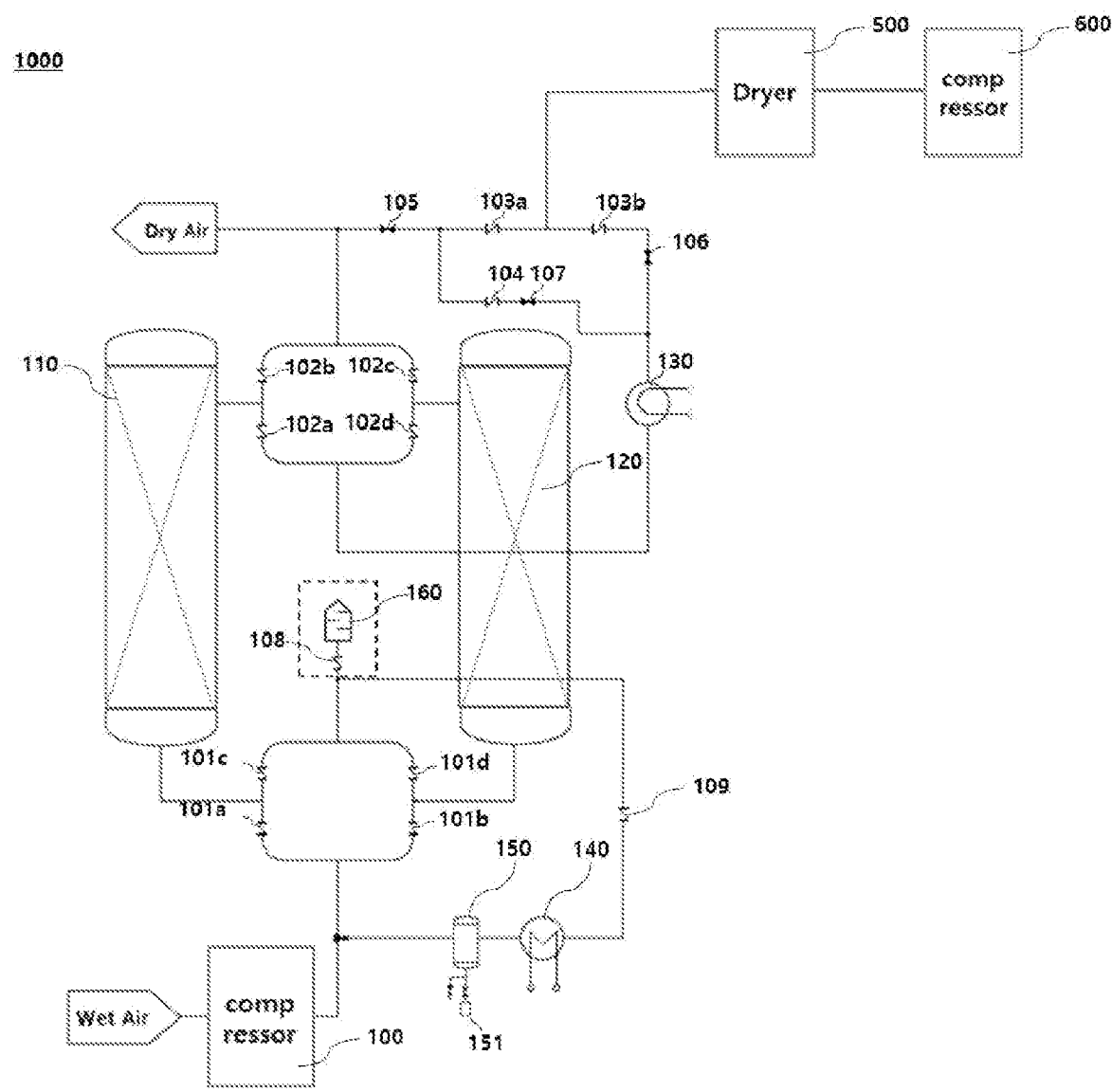
FIG. 3 is a diagram illustrating an air dryer according to an embodiment of the present disclosure.

FIG. 3 is a diagram illustrating an air dryer 1000 according to an embodiment of the present disclosure.

Referring to the FIG. 3, the air dryer 1000 according to an embodiment of the present disclosure includes a pair of main air dryer dehumidification tanks 110 and 120, a main compressor 100 for pressurizing wet air and supplying the pressurized wet air to an inlet line, a first direction switching valve units 101: 101a, 101b, 101c, and 101d, a regeneration special dryer 500, a second direction switching valve units 102: 102a, 102b, 102c, and 102d, a heating unit 130, and a cooler 140.

The pair of dehumidification tanks 110 and 120 are provided so that a dehumidification process and a regeneration process are alternately performed. The dehumidifying tank is filled with a dehumidifying agent that absorbs moisture by being combined with the moisture in wet air so that moisture is removed in the dehumidification tank where the dehumidifying process proceeds.

The main compressor 100 are provided to pressurize wet air and supply the pressurized wet air through the inlet line. The main compressor 100 applies a pressure of 7.0 to 9.0 kgf/cm$^2$G to pressurize the wet air supplied from the inlet line, and the pressurized wet air is supplied to the main air dryer dehumidification tank. A regeneration special compressor 600 is provided to compress the regeneration special dry air at a pressure of 0.2 to 0.7 kgf/cm$^2$G of which is higher than the pressure of the wet air pressurized by the main compressor 100 supplied from the inlet line. The regeneration special compressor 600 may be provided to supply the regeneration special dry air at a pressure of 7.2 to 9.7 kgf/cm$^2$G. The pressure of the regeneration special compressor 600 may provide a pressure that is about 3 to 7% P higher than the pressure of the main compressor 100.

The regeneration process for regenerating the dehumidifier is performed in a different dehumidification tank other than the dehumidification tank that performs the regeneration process to perform a continuous regeneration process.

That is, while the dehumidification process is performed in a single dehumidification tank, another dehumidification tank that already completes the dehumidification process performs a heating process for detaching the moisture absorbed in the dehumidifying agent through a compressed dry air of high temperature and a cooling process for cooling the heated dehumidification tank.

In the pair of main air dryer dehumidification tanks, the dehumidification process and the regeneration process are alternately performed in the respective dehumidification tanks.

The first direction switching valve units 101: 101a, 101b, 101c, and 101d is provided to transfer the path of the wet air supplied from the wet air inlet line of the dehumidification tank to the dehumidification tank that performs the dehumidification process between the pair of main air dryer dehumidification tanks or to transfer the path of the regenerated air discharged from the dehumidification tank that performs the regeneration process between the pair of main air dryer dehumidification tanks to the cooler 140.

Figure 4:
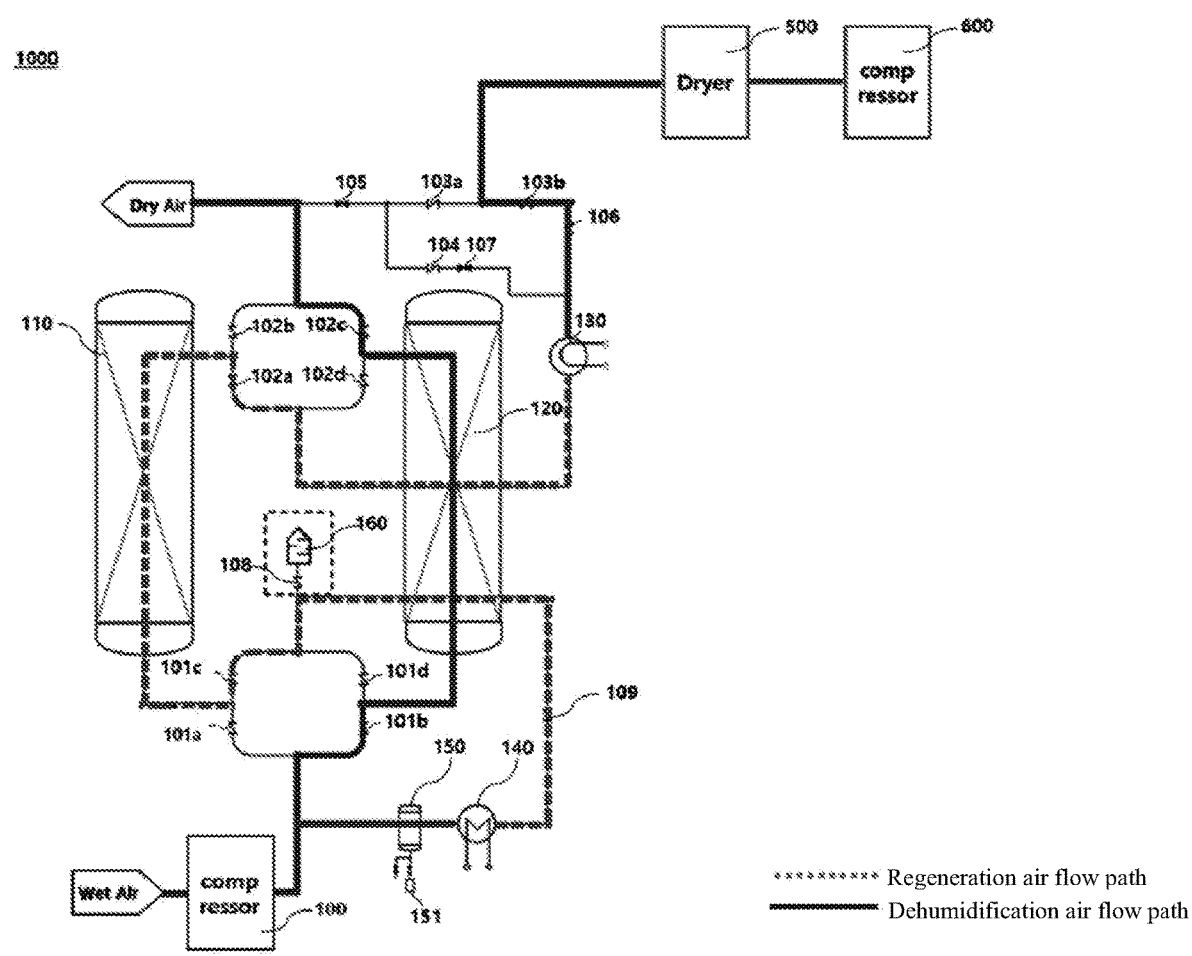
FIGS. 4 and 5 are diagrams illustrating production of compressed dry air and flow of regeneration special dry air of the regeneration process of the dehumidification tank according to an embodiment of the present disclosure.
Figure 5:
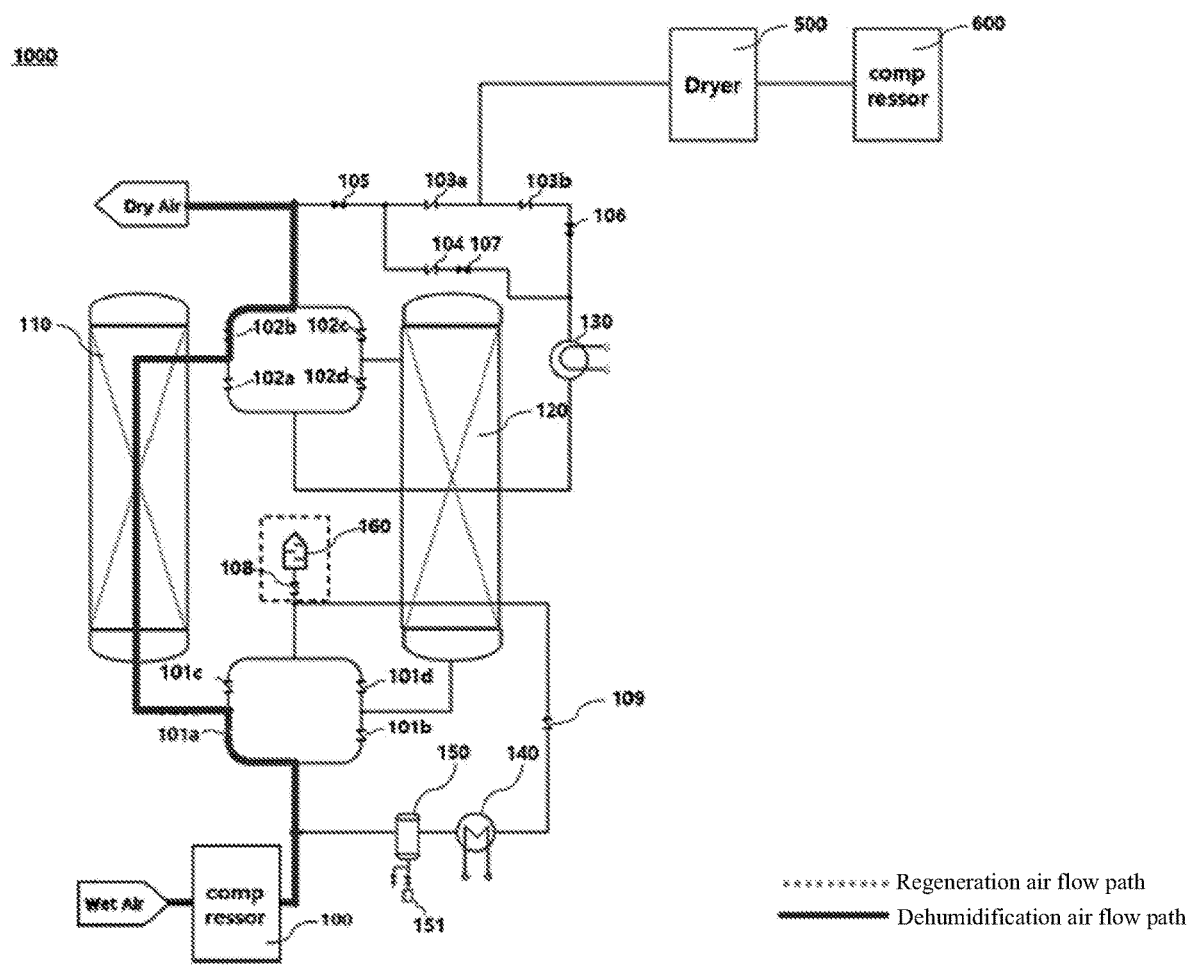

FIGS. 4 and 5 are diagrams illustrating production of compressed dry air and flow of regeneration special dry air of the regeneration process of the dehumidification tank in the air dryer 1000 according to an embodiment of the present disclosure.

Referring to FIG. 4 and FIG. 5, it may be identified the feature that the paths of the wet air supplied from the inlet line of the main air dryer are supplied to the respective dehumidification tanks in which the dehumidification process is performed.

Furthermore, as shown in FIG. 4 and FIG. 5, it may be identified the feature that directions are switched such that the hot regenerated air used in the heating process that heats the dehumidification tank in which the dehumidification process is already finished in the regeneration process and the cooling process is toward the cooler 140 in each drawing.

Referring to FIG. 4 and FIG. 5, the respective switching valves are disposed to switch the paths of the wet air and the regenerated air supplied from the inlet line. However, the first direction switching valve units 101: 101a, 101b, 101c, and 101d are not limited to those shown in the drawings, and any units may be used so long as the units are provided with a direction switch value so as to transfer the wet air and the regenerated air to each of the flow paths without being interfered.

Next, the regeneration special dryer 500 is provided to the regeneration special dry air to the dehumidification tank that performs the dehumidification process between the pair of dehumidification tanks.

FIG. 4 and FIG. 5 shows the feature that the regeneration special dry air supplied from the regeneration special dryer 500 moves toward the dehumidification tank in which the dehumidification process is finished via the heating unit 130.

As shown in the drawings, the compressed dry air produced in the regeneration special dryer 500 may be supplied to the dehumidification tank in which the dehumidification process, which requires the regeneration process with the regeneration special dry air of the main air dryer, is finished. Furthermore, the wet air introduced in the dehumidification process and the compressed dry air in which moisture is partially removed through the cooler 140 may be put together into the dehumidification process, and the load of the dehumidification tank in which the dehumidification process is performed may be reduced.

It is preferable that the regeneration special dry air supplied in the regeneration process is supplied in a higher pressure state than the wet air supplied in the inlet line of the air dryer 1000. The air dryer 1000 according to an embodiment of the present disclosure may further include a regeneration special compressor 600 that supplies compressed air to the regeneration special dryer 500.

Particularly, the regeneration special compressor 600 may be provided to generate the regeneration special dry air in a pressure of 0.2 to 0.7 kgf/cm$^2$G of which is higher than the pressure of the wet air supplied from the inlet line and to connect the cooled dry air path through the cooler 140 after the regeneration process of the main air dryer dehumidification tank is performed to the inlet line such that the dry airs used in the regeneration are joined.

For example, the design is reflected based on that the processing rate of flow of the air dryer 1000 is enlarged by about 30%. In the state that the main air dyer is operating in a pressure of about 7.0 kgf/cm$^2$G, the rate of flow of a separate regeneration special compressor 600 is about 3,000 Nm$^3$/h, and the dry air is produced by the regeneration special air dryer using the compressed air of which pressure is higher than the driving pressure of the air dryer 1000 of the present disclosure with the pressure that corresponds to about 7.2 to 7.5 kgf/cm$^2$G. The dry air is used in the regeneration process of the main air dryer dehumidification tank, and then joined in the inlet line of the main air dryer, and accordingly, the increased 3,000 Nm$^3$/h needs to be reflected.

Through this, the regeneration special dry air of about 3,000 Nm$^3$/h is joined with the inlet line together with the wet air of about 10,000 Nm$^3$/h of the main air dryer dehumidification tank, and the rate of flow of 13,000 Nm$^3$/h is introduced to the dehumidification tank and becomes dry air (refer to FIG. 4 and FIG. 5), and then, may be discharged through an outlet line.

Next, the second direction switching valve units 102: 102a, 102b, 102c, and 102d are provided to transfer the compressed dry air supplied from the dehumidification tank that performs the dehumidification process between the pair of dehumidification tanks or transfer the regeneration special dry air supplied from the regeneration special air dryer 500 to the dehumidification tank that performs the regeneration process between the pair of dehumidification tanks.

Referring to FIG. 4 and FIG. 5, it is shown the feature that the direction is switched such that the compressed dry air for which the dehumidification process is finished is discharged to the outlet line. In addition, it may be identified that the regeneration special dry air heated for the regeneration process is transferred to the dehumidification tank in which the dehumidification process is finished and the regeneration process is progressing.

Referring to FIG. 4 and FIG. 5, it may be identified that the switching valves are provided to switch the paths of the compressed dry air discharged from the outlet line and the regeneration special air heated by the dehumidification tank in which the regeneration process is progressing, respectively. However, the second direction switching valve units 102: 102a, 102b, 102c, and 102d are not limited to those shown in the drawings, but any units may be used so long as the units are provided with a direction switch value so as to transfer the compressed dry air and the heated regeneration special air to each of the flow paths without being interfered.

Next, the heating unit 130 heats the regeneration special dry air supplied from the regeneration special air dryer 500. The heating unit 130 is configured to heat the regeneration special dry air with about 200 to 280° C. and detach moisture which is attached to the dehumidifying agent of the dehumidification tank that performs the regeneration process and heats the dehumidifying agent during the regeneration process of about 1 to 3 hours.

The cooler 140 detaches moisture from the wet steam of high temperature generated by separating moisture by the dehumidifying agent filled in the dehumidification tank that performs the regeneration process between the pair of dehumidification tanks by the regeneration special air dryer heated by the heating unit 130 and generate condensate water, and exhausts the condensate water to the atmosphere using a trap.

The regeneration special air dryer used in the regeneration process is provided to be joined with the path of the wet steam for which the dehumidification process is performed and perform the dehumidification process together to produce the joined compressed dry air. In this case, the supersaturated wet steam of a high temperature supplied to the dehumidification tank in which the dehumidification process is performed may be a factor to decrease the dehumidification efficiency significantly. Furthermore, since the compressed dry air at room temperature should be discharged through the outlet line, in the case that the air of high temperature and high pressure of about 200 to 280° C. which is not cooled down is input to the dehumidification process, the dehumidification capacity of the dehumidifying agent is deteriorated and unable to fulfill the required degree of dryness, and the dry air produced after the dehumidification process is unable to be supplied with an appropriate temperature, that is, room temperature.

To prevent this, the air dryer 1000 according to an embodiment of the present disclosure may cool the wet steam of a high temperature which is detached by the dehumidifying agent filled in the dehumidification tank in which the dehumidification process is performed through the cooler 140, detach moisture contained in the wet steam and discharge the condensate water, and the compressed air from which moisture is detached is joined in the inlet line of the main air dryer dehumidification tank in which the dehumidification process is performed to be supplied to the dehumidification tank in which the dehumidification process is performed.

The air dryer 1000 according to an embodiment of the present disclosure may further include a moisture separator 150 connected to the cooler 140 and to separate the condensate water.

The moisture separator 150 may discharge the condensed water from which the regeneration special dry air of high relative humidity passes through the moisture separator 150 and moisture is condensed and separated may be discharged to the atmosphere through a trap. The wet air that passes through the moisture separator 150 is in the state in which moisture is separated and contains moisture of low density, joined with the wet air in the wet air inlet line, and then, supplied to the main air dryer dehumidification tank in which the dehumidification process is performed.

In the state in which the moisture separator 150 is included, the wet air inlet line of the main air dryer 1000 according to an embodiment of the present disclosure is connected to the moisture separator 150, the regeneration special dry air that passes through the moisture separator 150 may be supplied to another dehumidification tank in which the dehumidification process is performed together with the wet air input from the wet air inlet line.

Figure 6:
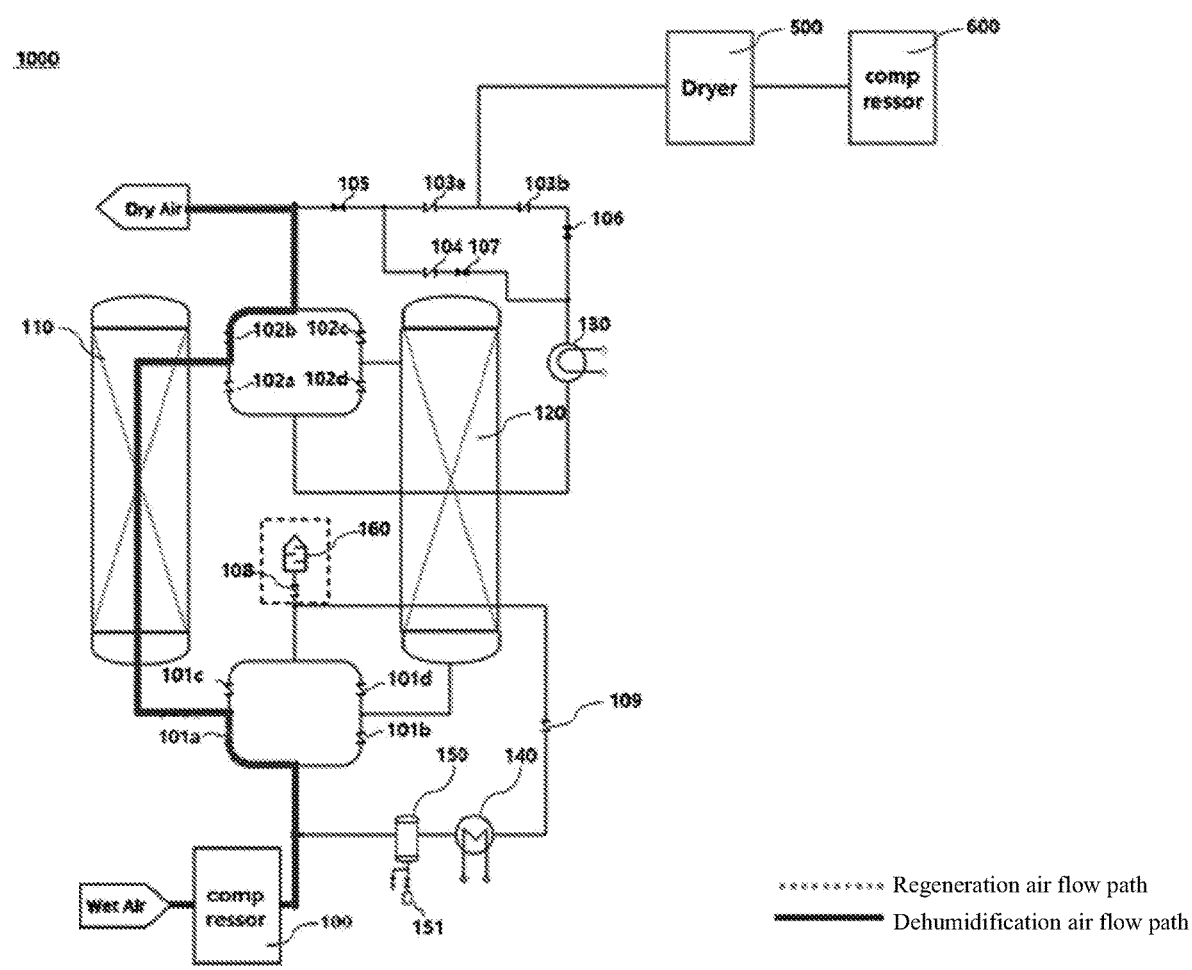
FIG. 6 is an exemplary diagram illustrating the case that only the dehumidification process is performed in the air dryer according to an embodiment of the present disclosure.

FIG. 6 is an exemplary diagram illustrating the case that only the dehumidification process is performed in the air dryer 1000 according to an embodiment of the present disclosure.

After the heating process of the dehumidification tank is finished, the operation of the heating unit 130 is stopped, and the cooling process of about 1 to 3 hours is performed, in which the temperature of the dehumidification tank in which the dehumidification process is performed is cooled down to reach room temperature. Since the temperature of the dehumidifying agent filled in the dehumidification tank which is heated is in a high temperature state of about 200 to 280° C., the dehumidification tank needs to be cooled down to room temperature again to increase the dehumidification efficiency of the input wet air and increase the production efficiency of dry air.

In the cooling process, a moisture removing process may be further included, in which the cooled wet steam is supplied to the moisture separator 150 to remove moisture. In the case that the wet air is joined with the wet steam in the inlet line, the operation time of the dehumidification tank in which the dehumidification process is performed may be reduced, and the absorption efficiency and life of the dehumidifying agent are disadvantageous. Therefore, the condensate water is generated, separated, and discharged through cooling such that the input wet air does not exceed a proper humidity limit.

Meanwhile, the air dryer 1000 according to an embodiment of the present disclosure may further include a third direction switching valve unit provided to transfer the path of the regeneration special dry air supplied from the regeneration special dryer 500 to either one direction between a direction to the outlet line or a direction to the heating unit 130.

Furthermore, the air dryer 1000 according to an embodiment of the present disclosure may further include a first control valve 105 in the direction to the outlet line and a second control valve 106 in the direction to the heating unit 130 to control the state in which the regeneration special dry air is transferred to outer opposite ends of the third direction switching valve unit.

Figure 7:
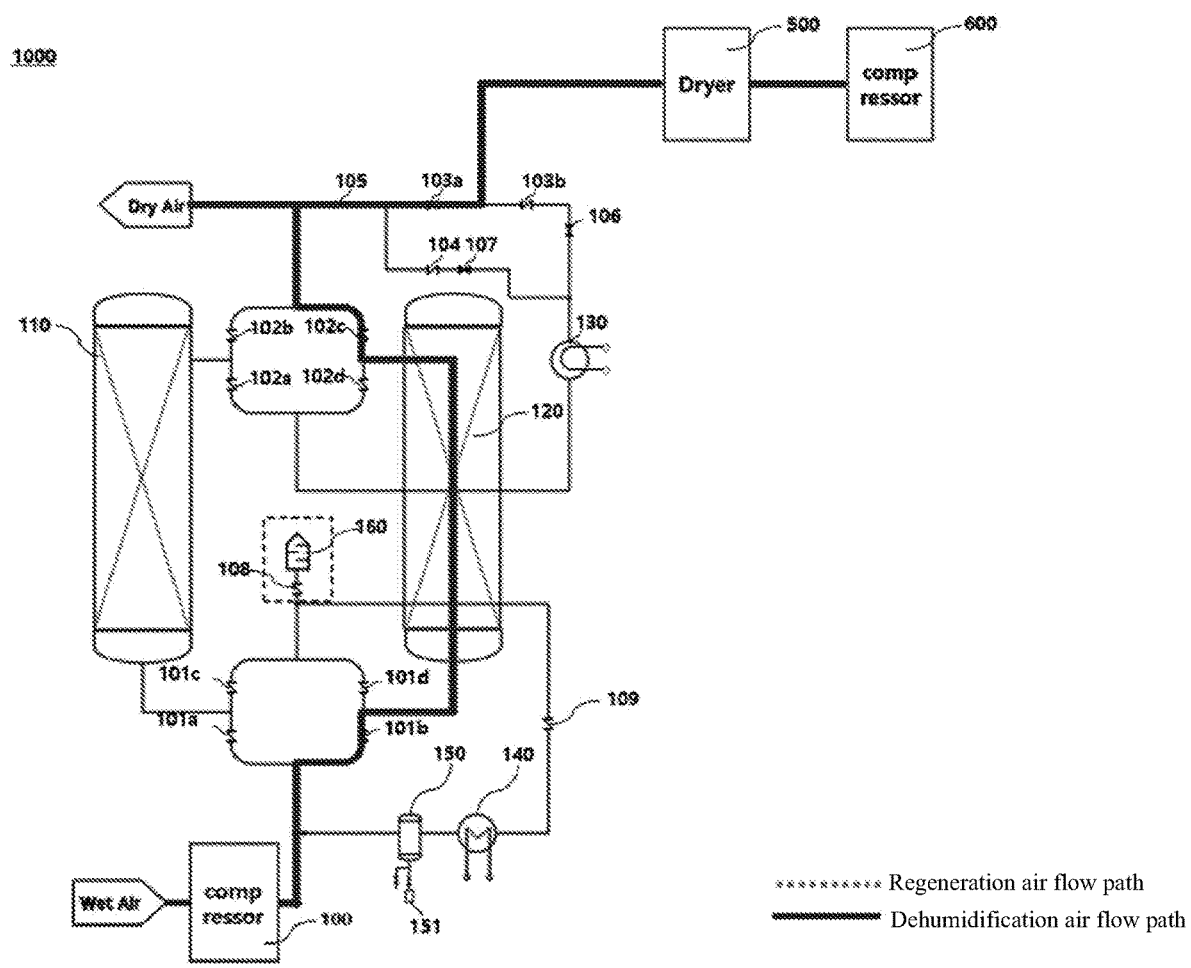
FIGS. 7 and 8 are diagrams illustrating the feature that after the regeneration process for about 1 to 3 hours is finished, the regeneration special dry air is joined with the compressed dry air for which the dehumidification process of the dehumidification tank that performs the dehumidification process is finished and moves to the outlet line in the air dryer 1000 according to an embodiment of the present disclosure.
Figure 8:
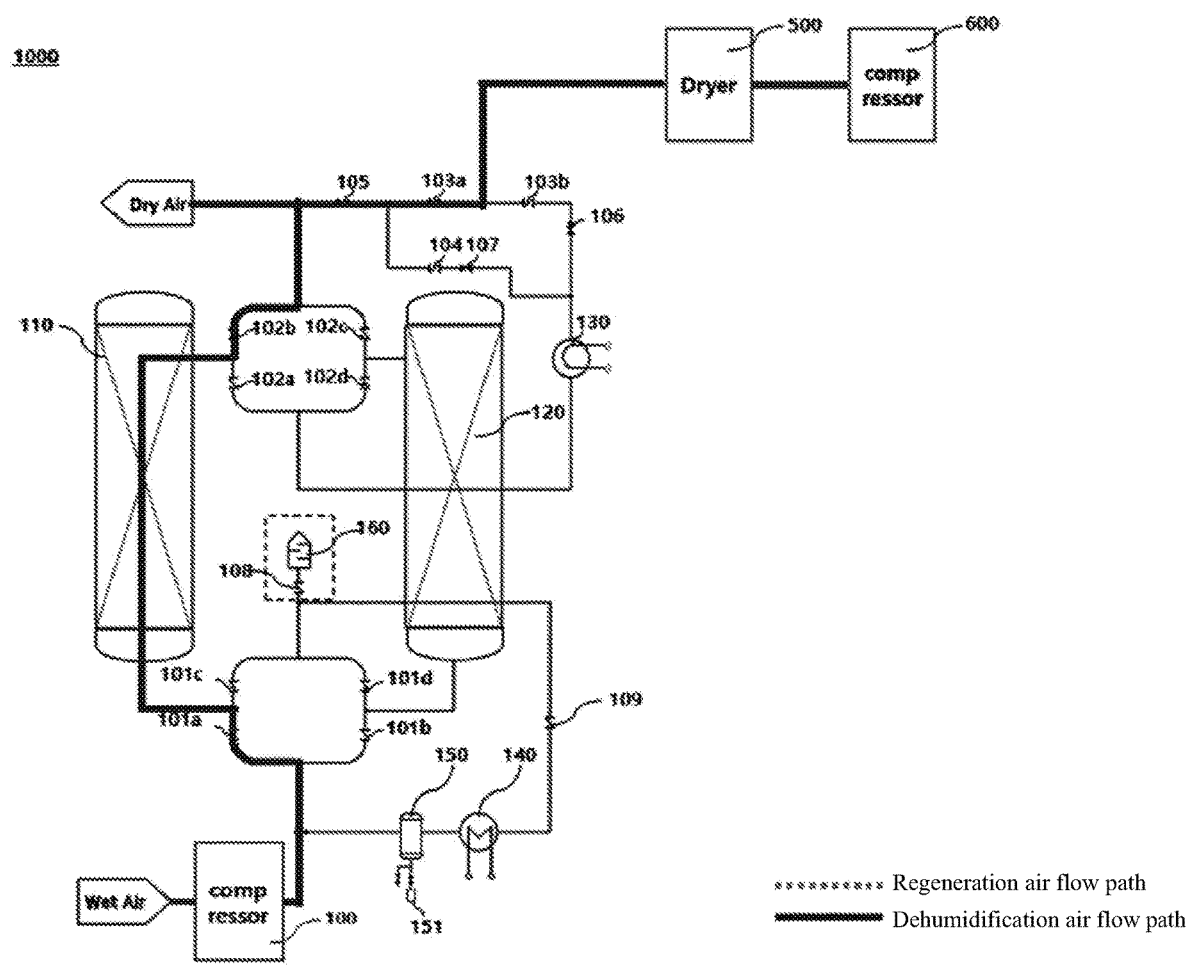

FIGS. 7 and 8 are diagrams illustrating the feature that after the regeneration process for about 1 to 3 hours is finished, the regeneration special dry air is joined with the compressed dry air for which the dehumidification process of the dehumidification tank that performs the dehumidification process is finished and moves to the outlet line in the air dryer 1000 according to an embodiment of the present disclosure.

When the operation of the heating unit 130 is stopped, the regeneration special dry air toward the dehumidification tank in which the dehumidification process is performed is blocked and the regeneration special dry air is directly connected to the outlet line and discharged by the third direction switching valve unit 103: 103a and 103b.

The air dryer according to an embodiment of the present disclosure may be provided to supply the dry air of which dew point temperature is close to about −100° C. to the place that requires highly dried air such as for a semiconductor manufacturing facility. However, as shown in FIG. 7 or FIG. 8, the regeneration special dry air may be directly connected to the outlet line, and the dry air of which dew point temperature is close to about −40° C. may be supplied. In the case that it will be fine to supply the highly dry air of which dew point temperature is relatively high such as for a food storage facility or warehouse, the regeneration special dry air is supplied together through the outlet line, and excessive energy waste may be prevented.

In the case that the regeneration special dry air is supplied with the dehumidification process or the cooling process is performed during the regeneration process and the regeneration special dry air is directly supplied to the outlet line, since the inlet line or the outlet line of the air dryer has a pressure of about 7.0 to 9.0 kgf/cm$^2$G generally, the regeneration special compressor 600 may be provided to compress the regeneration special dry air to compress the regeneration special dry air with 7.0 to 9.0 kgf/cm$^2$G higher pressure.

The air dryer 1000 according to an embodiment of the present disclosure may further include a bypass flow path to connect between the third direction switching valve unit 103: 103*a* and 103*b* and the first control valve 105, and between the second control valve 106 and the heating unit 130, and in the bypass flow line, a second valve 104 provided to block or pass through the compressed dry air transferred from the first direction switching valve and a third control valve 107 to control a state of transferring the compressed dry air that passes through the second valve 140 may be provided. By the continuous operation of the regeneration special dryer 500, enough amount of compressed dry air may be discharged to the outlet line, and the highly efficient dehumidification process may be performed. In order to provide the compressed dry air stably, the dew point temperature of the compressed dry air that passes through the dehumidification tank that performs the dehumidification process between the pair of main air dryer dehumidification tanks and the dew point temperature of the regeneration special dry air supplied from the regeneration special dryer 500 need to be designed to be equal to or lower than the dryness of the main air dyer.

According to the required degree of dryness of the dry air produced through the dehumidification tank of the main air dryer, the dryness of the compressed dry air of the regeneration special dryer 500 needs to be designed to be flexibly suppled. Particularly, the dryness needs to be designed to be equal to or lower than the dryness of the main air dyer, while the continuous dehumidification process is performed, the operation of the regeneration special dryer 500 is managed in accordance with a situation, the air may be supplied to the outlet line together or introduced to the dehumidification process together.

The outlet line for discharging the compressed dry air may be positioned in an indoor environment which is not directly exposed to an outdoor environment. However, in the case that the outlet line is directly exposed to the outdoor environment, considering the natural condition placed the temperature condition of about −20 to −30° C. owing to a cold wave, it is preferable that the dew point temperature of the compressed dry air discharged through the outlet line is lower than −40° C.

Furthermore, the case of the compressed dry air of which dew point temperature is about −100° C. is not required for daily life, but in some cases, in a specific field such as the semiconductor manufacturing field, the less dryness may be required. In other cases, it is preferable that the dew point temperature (x) of the compressed dry air is in the range of −40 to −100° C.

A method for drying compressed air according to another embodiment includes a dehumidification process, in which the wet air supplied through the inlet line of the air dryer passes through a preconfigured dehumidification tank between the pair of dehumidification tanks, and the moisture of the wet air is absorbed to the dehumidifying agent, and the produced dry air is discharged to the outlet line.

In the dehumidification process, the wet air of room temperature changes to a dry state by the dehumidifying agent filled within the dehumidification tank, and for example, the dehumidification process for the wet air of about 10,000 Nm$^3$/h is performed in a range of about 4 hours, which is regarded as a preferable standard for the economic aspect considering the installment area and the maintenance, and therefore, commonly used.

In order to heat and regenerate the dehumidifying agent that absorbs the moisture included in another dehumidification tank that has performed the dehumidification process already while the dehumidification process is progressing, separate regeneration special dry air is supplied from the regeneration special dryer 500 and heated by the heating unit 130 installed in a heating line, and the heated regeneration special dry air is supplied to the dehumidification tank in which another dehumidification process is already finished and passes therethrough, and accordingly, the dehumidifying agent that absorbs the moisture is heated and the moisture is separated.

Conventionally, about 8 to 15% of the dry air that corresponds to a part of the dry air for which the dehumidification process is finished is used for the regeneration and discharged to the atmosphere. However, the air dryer 1000 according to an embodiment of the present disclosure receives the regeneration special dry air through the separate regeneration special dryer 500 and the regeneration special compressor 600, and heats and uses the regeneration special dry air, which makes that the regeneration process is performed while a part of the high pressure dry air of the outlet line is not used, and the dry air which was used to the regeneration is reused, and therefore, the lost compressed air may be substantially reduced.

The regeneration special compressor 600 may be provided to supply the regeneration special dry air at a pressure of 7.2 to 9.7 kgf/cm$^2$G. The pressure of the regeneration special compressor 600 may provide a pressure that is about 3 to 7% P higher than the pressure of the main compressor 100.

That is, the main compressor 100 are provided to pressurize wet air and supply the pressurized wet air through the inlet line, and applies a pressure of 7.0 to 9.0 kgf/cm$^2$G to pressurize the wet air supplied from the inlet line, and accordingly, the pressurized wet air is supplied to the main air dryer dehumidification tank. The regeneration special compressor 600 is provided to compress the regeneration special dry air at a pressure of 0.2 to 0.7 kgf/cm$^2$G of which is higher than the pressure of the wet air pressurized by the main compressor 100 supplied from the inlet line, and therefore, the energy waste in the dehumidification process may be prevented.

In addition, in the state that the power of the heating unit 130 is shut off and the driving is stopped after the heating process is finished, the cooling process of 1 to 3 hours is included such that the hot air in the wet steam state is cooled down to reach room temperature. Since the temperature of the dehumidifying agent filled in the heated and hot dehumidification tank is in the high temperature state about 200 to 280° C., the high temperature state needs to be the state of cooled down to room temperature such that the dehumidification efficiency of the input wet air is improved, and the production efficiency of the dry air is improved.

The cooling process may further include a moisture removing process in which the condensate water of which moisture is detached by supplying the cooled wet steam to the moisture separator 150 is discharged through a trap such that the separated compressed air is reused. In the case that the air is joined with the wet steam of the inlet line of the air dryer in the state of including moisture, the driving time of the dehumidification tank that performs the dehumidification process may be decreased and disadvantageous in the absorption efficiency and life of the dehumidifying agent, and therefore, the condensate water is generated and separated through cooling not to exceed a proper humidity limit of the wet air which is input.

In this case, the pressure of the regeneration special dry air that goes through the moisture removing process needs to exceed the pressure of the wet air supplied through the inlet line of the air dryer so as to be easily introduced to the wet steam inlet line.

As described above, according to the present disclosure, the air required for regeneration (heating and cooling) required for the existing air dryer 1000 is not partially drawn from the air dryer outlet line, but separate dry air having a pressure (a maximum of about 0.2 to 0.7 kgf/cm$^2$G) higher than the driving pressure exerted to the inlet line is received and used for regeneration (heating and cooling), and the dry air generated in the dehumidification tank together with the regeneration special air of which the amount is increased by sending the dry air to the inlet line of the wet air after being used for the regeneration and joined with the wet air is totally reused, and there is no air loss.

Here, the process of setting the third direction switching valve unit 103: 103$a$ and 103$b$ to the outlet line path, which is provided to transfer the path of the regeneration special dry air supplied from the regeneration special dryer 500 to either one direction between the directions to the outlet line or the heating unit 130 such that the regeneration special dry air supplied from the regeneration special dryer 500 is transferred to the outlet line while the cooling process is performed.

Meanwhile, according to another embodiment of the present disclosure, the dehumidification process that discharges the produced dry air to the outlet line may include the process of shutting down the third direction switching valve unit such that the regeneration special dry air supplied from the regeneration special dryer is not supplied to the outlet line. This is designed such that only the highly dried air is supplied through the outlet line.

An embodiment of the present disclosure may include a step of cooling the wet steam that passes through the cooling process by the cooler and a step of separating the moisture separated by the cooler through the moisture separator.

Particularly, the moisture included in the wet steam may be detached and humidity may be reduced by passing through the step of cooling the wet steam that passes through the cooling process by the cooler and the step of separating the moisture detached by the cooler through the moisture separator.

Through the process of separating moisture by the cooler, the air of which the amount of moisture or humidity is reduced is mixed with the air in the inlet line and introduced to the dehumidification process, and the load of the dehumidification tank that performs the dehumidification process required to increase the amount of output dry air may be decreased.

Referring to FIG. 4, first, the wet air of the inlet line and the regeneration special dry air are joined and move to the first dehumidification tank 110 in which the dehumidification process is performed. The compressed dry air which is dried through the first dehumidification tank 110 is discharged to the outlet line. Simultaneously, the regeneration special dry air supplied from the regeneration special dryer 500 is supplied to the second dehumidification tank 120 after being heated in the heating unit 130, the moisture is detached by the dehumidifying agent filled in the second dehumidification tank 120 and transferred to the cooler 140, and the cooled regeneration special dry air of which moisture is removed through the cooler and the discharge trap is joined with the wet air in the inlet line.

Although it is not shown in the drawing, the air dryer 1000 according to an embodiment may be connected to the regeneration special dryer 500 in parallel and construct a system.

In an exemplary system, the air of about 6,000 Nm$^3$/h passing through the regeneration special dryer 500 is divided by the amount of about 3,000 Nm$^3$/h and introduced to the dehumidification tank regeneration processes (heating and cooling) of the main air dryer connected in parallel.

The wet steam generated after performing the processes is passing through the cooler 140 and the moisture separator 150 to detach moisture. In this case, the condensate water separated through the discharge trap 151 connected to the moisture separator 150 is discharged, the air for which the condensate water is separated is joined in the dehumidification tank wet air inlet (inlet line) of the main air dryer, and the entire quantity of the regenerated air which was used for the regeneration is used for the dehumidification process, and accordingly, the energy saving efficiency may be maximized.

In an exemplary system, the compressed air of about 6,000 Nm$^3$/h supplied from the regeneration special dryer 500 and the regeneration special compressor 600 is divided in half and used as the amount of flow required to regenerate the wet air flow of about 10,000 Nm$^3$/h in each of two sets of the air dryers 1000, and joined and processed such that the amount of flow of about 13,000 Nm$^3$/h is produced. Although it is not shown in the drawing, when the amount of the regeneration special dry air supplied from the regeneration special dryer 500 and the regeneration special compressor 600 is increased, the compressed air dry system in which the number of dehumidification tanks that performs the dehumidification process is increased in that degree may be provided.

In the disclosure and the drawings, the preferred embodiment of the present invention is disclosed. Although specific terms are used herein, the terms are just used in the general meanings to easily describe the description of the invention and help understanding of the invention, but not intended to limit the scope of the present invention. It is understood that the other modified examples based on the inventive concept of the present invention is also able to be embodied as well as the embodiment disclosed herein to those of ordinary skilled in the art to which the present invention pertains.

What is claimed is:

1. An air dryer, comprising:
   a pair of main air dryer dehumidification tanks in which a dehumidification process and a regeneration process are alternately performed;
   a main compressor for compressing wet air to supply the wet air to an inlet line;
   a first direction switching valve unit configured to transfer a path of compressed wet air supplied from the inlet line to a dehumidification tank of the dehumidification tanks that performs the dehumidification process between the pair of main air dryer dehumidification tanks or to transfer a path of the regenerated air discharged from the dehumidification tank that performs the regeneration process between the pair of main air dryer dehumidification tanks;
   a regeneration special dryer configured to transfer regeneration special dry air to the dehumidification tank of a main air dryer that performs the regeneration process between the pair of main air dryer dehumidification tanks;

a second direction switching valve unit configured to transfer compressed dry air supplied from the dehumidification tank that performs the dehumidification process between the pair of dehumidification tanks or transfer the regeneration special dry air supplied from the regeneration special dryer to the dehumidification tank that performs the regeneration process between the pair of dehumidification tanks;

a heating unit configured to heat the regeneration special dry air supplied from the regeneration special dryer;

a cooler configured to detach moisture from a dehumidifying agent filled in the dehumidification tank that performs the regeneration process between the pair of dehumidification tanks by the regeneration special airdryer heated by the heating unit and generate condensate water; and a regeneration special compressor connected to the regeneration special dryer and configured to supply compressed air of a pressure that is 3 to 7% higher than a compressed air input to the tank in which the dehumidification process is performed to the regeneration special dryer, wherein a path of cooled dry air passing through the cooler is connected to the inlet line.

2. The air dryer of claim 1, wherein a dew point temperature (y) of the regeneration special dry air supplied from the regeneration special dryer is equal to or lower than a dew point temperature (x) of compressed dry air passing through the dehumidification tank that performs the dehumidification process between the pair of main air dryer dehumidification tanks, and the dew point temperature of compressed dry air is −40 to −100° C.

3. The air dryer of claim 1, further comprising a moisture separator connected to the cooler and to separate the condensate water.

4. The air dryer of claim 1, further comprising a third direction switching valve unit configured to transfer a path of the regeneration special dry air supplied from the regeneration special dryer to either one direction between a direction to an outlet line or a direction to the heating unit.

5. The air dryer of claim 4, further comprising a first control valve in a direction to the outlet line and a second control valve in a direction to the heating unit to control a state in which the regeneration special dry air is transferred to outer opposite ends of the third direction switching valve unit.

6. The air dryer of claim 5, further comprising a bypass flow path to connect between the third direction switching valve unit and the first control valve, and between the second control valve and the heating unit, wherein in the bypass flow line, a second valve provided to block or pass through compressed dry air transferred from the first direction switching valve and a third control valve to control a state of transferring compressed dry air that passes through the second valve are provided.

7. A method for drying compressed air, comprising:

pressurizing wet air using a main compressor and supplying compressed wet air to an inlet line;

a dehumidification process in which compressed wet air supplied from the inlet line is passing through a preset dehumidification tank between a pair of main air dryer dehumidification tanks in which a dehumidifying agent is filled, moisture of the wet air is absorbed in the dehumidifying agent, and produced dry air is discharged to an outlet line;

a heating process in which separate regeneration special dry air is supplied from a regeneration special dryer and heated by a heating unit installed in a heating line to heat and regenerate the dehumidifying agent that absorbs the moisture included in another dehumidification tank that has performed the dehumidification process already while the dehumidification process is progressing, and heated regeneration special dry air is supplied to another dehumidification tank and passes therethrough, and then, the dehumidifying agent that absorbs the moisture is heated and the moisture is detached; and a cooling process of 1 to 3 hours such that hot air in a wet steam state reaches room temperature in a state in which power of the heating unit is shut off and driving is stopped after the heating process is finished, wherein the method further comprises:

setting a third direction switching valve unit configured to transfer a path of the regeneration special dry air supplied from the regeneration special dryer to either one direction between a direction to the outlet line or a direction to the heating unit such that the regeneration special dry air supplied from the regeneration special dryer is transferred to the outlet line.

* * * * *